(12) United States Patent
Willis et al.

(10) Patent No.: US 10,380,292 B1
(45) Date of Patent: Aug. 13, 2019

(54) SYSTEMS AND METHODS FOR FINITE DIFFERENCE TIME DOMAIN SIMULATION OF AN ELECTRONIC DESIGN

(71) Applicant: Cadence Design Systems, Inc., San Jose, CA (US)

(72) Inventors: Kenneth Robert Willis, Matthews, NC (US); Jing Wang, Shanghai (CN); Hui Qi, Shanghai (CN); Xuegang Zeng, Westborough, MA (US); Zhen Mu, North Chelmsford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 245 days.

(21) Appl. No.: 15/094,180

(22) Filed: Apr. 8, 2016

(51) Int. Cl.
| | |
|---|---|
| *G06F 17/00* | (2019.01) |
| *G01R 13/00* | (2006.01) |
| *G01R 31/00* | (2006.01) |
| *G06F 17/50* | (2006.01) |
| *G01R 31/28* | (2006.01) |
| *G01R 31/3183* | (2006.01) |
| *G01R 13/02* | (2006.01) |
| *G01R 31/317* | (2006.01) |

(52) U.S. Cl.
CPC ..... *G06F 17/5036* (2013.01); *G01R 31/2803* (2013.01); *G01R 31/318357* (2013.01); *G06F 17/5045* (2013.01); *G06F 17/5081* (2013.01); *G01R 13/029* (2013.01); *G01R 31/2848* (2013.01); *G01R 31/317* (2013.01); *G06F 17/5009* (2013.01); *G06F 17/5068* (2013.01); *G06F 2217/02* (2013.01); *G06F 2217/04* (2013.01); *G06F 2217/06* (2013.01); *G06F 2217/08* (2013.01); *G06F 2217/16* (2013.01); *G06F 2217/64* (2013.01); *G06F 2217/74* (2013.01); *G06F 2217/86* (2013.01)

(58) Field of Classification Search
None
See application file for complete search history.

(56) References Cited

U.S. PATENT DOCUMENTS

| | | |
|---|---|---|
| 5,504,423 A | 4/1996 | Fang |
| 5,566,083 A | 10/1996 | Fang |

(Continued)

OTHER PUBLICATIONS

F. Kung et al., "A Finite-Difference Time-Domain (FDTD) Software for Simulation of Printed Circuit Board (PCB) Assembly," Progress in Electromagnetics Research, PIER 50, 2005, pp. 299-335.*

(Continued)

*Primary Examiner* — Leigh M Garbowski
(74) *Attorney, Agent, or Firm* — Mark H. Whittenberger, Esq.; Holland & Knight LLP (57) ABSTRACT

The present disclosure relates to a computer-implemented method for use in an electronic design. Embodiments may include receiving, using at least one processor, an electronic design and linking a printed circuit board (PCB) block to a physical layout associated with the electronic design. Embodiments may further include receiving, at a layout environment, at least one simulation parameter and performing, using a finite difference time domain ("FDTD") simulator, a time-domain simulation, based upon, at least in part, the at least one simulation parameter.

20 Claims, 6 Drawing Sheets

(56) References Cited

U.S. PATENT DOCUMENTS

| | | | | |
|---|---|---|---|---|
| 6,106,567 A | * | 8/2000 | Grobman | G06F 17/5036 703/14 |
| 6,219,629 B1 | * | 4/2001 | Namiki | G06F 17/5036 703/13 |
| 6,269,467 B1 | * | 7/2001 | Chang | G06F 17/5022 716/104 |
| 6,285,973 B1 | * | 9/2001 | Nishino | G01R 31/001 703/13 |
| 6,536,028 B1 | * | 3/2003 | Katsioulas | G06F 17/5068 716/114 |
| 7,027,941 B2 | * | 4/2006 | Nagase | G06F 17/5036 324/247 |
| 7,437,693 B1 | * | 10/2008 | Somaya | G06F 17/5009 716/136 |
| 8,019,578 B2 | * | 9/2011 | Kiso | G01R 33/02 703/14 |
| 8,060,313 B2 | * | 11/2011 | Takeuchi | G06F 17/5036 702/14 |
| 8,386,229 B1 | * | 2/2013 | Anderson | G06F 17/5036 703/13 |
| 8,484,605 B2 | * | 7/2013 | Tan | G06F 17/30271 716/110 |
| 8,768,677 B2 | * | 7/2014 | Teramae | G06F 17/50 703/13 |
| 9,411,925 B2 | * | 8/2016 | Meng | G06F 17/5081 |
| 2006/0036421 A1 | * | 2/2006 | Sekino | G06F 17/5009 703/13 |

OTHER PUBLICATIONS

M. Madbouly et al, "MATLAB—SPICE Interface (MAYSPICE) and Its Applications," ICM 2003, pp. 37-40.*

N. Matsui et al., "SPICE Based Analysis of Radiation from PCBs and Related Structures," IEEE 1997 Int'l Symposium on Electromagnetic Compatibility, pp. 320-325.*

V.A. Thomas et al., "The Use of SPICE Lumped Circuits as Sub-grid Models for FDTD Analysis," IEEE Microwave and Guided Wave Letters, vol. 4, No. 5, May 1994, pp. 141-143.*

M. Piket-May et al., "Packaging and Interconnect (sic) Design and Analysis using FDTD," 1997 IEEE, pp. 87-90.*

M. Piket-May et al., "A Powerful EM Analysis Tool based on the FD-TD Simulation Method," ANTEM'96, IEEE, pp. 309-311.*

I. Rumsey et al., "S-Parameter Macromodels Incorporated into FDTD Simulation of Transmission Line Networks," SPI 2002, IEEE, pp. 37-40.*

H. Kimura et al., "A Unified Technique for PCB/MCM Design by Combining Electromagnetic Field Analysis with Circuit Simulator," 1998 Proc. DATE, IEEE, 2 pages.*

T. Watanabe et al., "Analysis of PCB Interconnects Using Electromagnetic Reduction Technique," 2003 IEEE, pp. 498-501.*

R. Gravrok et al., "An Integrated Methodlogy to Model and Visualize the Complex Electrodynamics of 3D Structures," 1995, Cray Research, Inc. pp. 74-76.*

T. Watanabe et al., "Synthesis of Time-Domain Models for Interconnects Having 3-D Structure Based on FDTD Method," IEEE Trans. on Circuits and Systems—II: Analog and Digital Signal Processing, vol. 47, No. 4, Apr. 2000, pp. 302-305. (Year: 2000).*

T. Watanabe et al., "Parallel-Distributed FDTD-Based Full-Wave Simulator for Large-Scale Printed Wiring Boards," 2002 IEEE, pp. 287-290. (Year: 2002).*

S. E. Krakiwsky et al., "Graphics Processor Unit (GPU) Acceleration of Finite-Difference Time-Domain (FDTD) Algorithm," ISCAS 2004 IEEE, pp. 265-268. (Year: 2004).*

* cited by examiner

SYSTEMS AND METHODS FOR FINITE DIFFERENCE TIME DOMAIN SIMULATION OF AN ELECTRONIC DESIGN

FIELD OF THE INVENTION

The present disclosure relates to electronic design techniques, and more specifically, to a system and method for finite difference time domain simulation that may include layout association at the system level of an electronic design.

DISCUSSION OF THE RELATED ART

Electronic packaging refers to the physical implementations of electrical circuits of integrated circuit (IC) chips, modules, chip or module carriers, cards, boards or backplanes. Such components and devices are often referred to as electronic packaging structures. The terms "electronic packaging structure", "electronic package" and "package" are hereinafter used interchangeably to refer to any or all of the aforementioned devices and structures. For purposes of this discussion, such structures include multilayered packaging, in which a plurality of substantially parallel conductive planes (designated as ground and/or power planes) are separated from one another by non-conductive dielectric material.

It has long been the practice of digital electronic system designers to employ simulation techniques to predict the ultimate behavior of those systems before the actual hardware implementation thereof. As large-scale integration (LSI) and very large-scale integration (VLSI) techniques have allowed greater numbers of circuits to be packaged in smaller spaces, it has become increasingly difficult to construct physical prototypes of proposed digital systems prior to the actual construction of the chip. Therefore, although the simulation of proposed systems was once merely advisable, it is now necessary.

Memory interfaces are challenging signal integrity engineers from the chip, to the package, to the board, and across multiple boards. One of the primary challenges is accurately measuring timing while considering the fluctuations in power and ground rails that occur due to simultaneously switching signals. In the worst case, when all 64 bits of a data bus transition simultaneously, large instantaneous changes in current across the power distribution networks (PDNs) cause fluctuations in voltage levels that impact the timing margins of the transitioning signals.

SUMMARY

In one or more embodiments of the present disclosure, a computer-implemented method is provided. The method may include receiving, using at least one processor, an electronic design and linking a printed circuit board (PCB) block to a physical layout associated with the electronic design. The method may further include receiving, at a layout environment, at least one simulation parameter and performing, using a finite difference time domain ("FDTD") simulator, a time-domain simulation, based upon, at least in part, the at least one simulation parameter.

One or more of the following features may be included. In some embodiments, performing the time-domain simulation may not require an S-parameter model. In some embodiments, linking may be performed using a block-based electronic design environment. In some embodiments, the method may include displaying at least one simulation result at a graphical user interface associated with the block-based electronic design environment. The method may also include receiving at least one additional block at the block-based electronic design environment. In some embodiments, the additional block may be at least one of a package block and a device block. The additional block may be represented by a SPICE model. In some embodiments, the additional block may be represented by an S-parameter model. The method may further include connecting the SPICE model to a physical layout database.

In some embodiments, a computer-readable storage medium having stored thereon instructions that when executed by a machine result in one or more operations is provided. Operations may include receiving, using at least one processor, an electronic design and linking a printed circuit board (PCB) block to a physical layout associated with the electronic design. Operations may further include receiving, at a layout environment, at least one simulation parameter and performing, using a finite difference time domain ("FDTD") simulator, a time-domain simulation, based upon, at least in part, the at least one simulation parameter.

One or more of the following features may be included. In some embodiments, performing the time-domain simulation may not require an S-parameter model. In some embodiments, linking may be performed using a block-based electronic design environment. In some embodiments, operations may include displaying at least one simulation result at a graphical user interface associated with the block-based electronic design environment. Operations may also include receiving at least one additional block at the block-based electronic design environment. In some embodiments, the additional block may be at least one of a package block and a device block. The additional block may be represented by a SPICE model. In some embodiments, the additional block may be represented by an S-parameter model. Operations may further include connecting the SPICE model to a physical layout database.

In one or more embodiments of the present disclosure, a system is provided. The system may include a computing device configured to receive an electronic design and link a printed circuit board (PCB) block to a physical layout associated with the electronic design. The computing device may be further configured to receive, at a layout environment, at least one simulation parameter. The computing device may be further configured to perform, using a finite difference time domain ("FDTD") simulator, a time-domain simulation, based upon, at least in part, the at least one simulation parameter.

One or more of the following features may be included. In some embodiments, performing the time-domain simulation may not require an S-parameter model. In some embodiments, linking may be performed using a block-based electronic design environment. In some embodiments, the computing device may be configured to display at least one simulation result at a graphical user interface associated with the block-based electronic design environment.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure may be used to accurately analyze fast changing signals to provide effective bus modeling from the chip, to the package, to the board, and across multiple boards. As is described in further detail below, embodiments of the present disclosure may utilize a block-level modeling methodology. This approach no longer uses a "wire-by-wire" connection found in traditional schematic-based tools. Instead, each part of a bus system may be represented by a block at a graphical user interface that may be manipulated by a designer. Corresponding models may be pre-calculated and assigned to each block. The connectivity between blocks may be reserved through a hierarchical connection protocol.

More specifically, and referring also to FIGS. 1-6, embodiments of the present disclosure relate to a system and method for finite difference time domain simulation that may include layout association at the system level of an electronic design. Accordingly, embodiments of the present disclosure may be configured to utilize FDTD to solve the complex layout (e.g., including planes, traces, vias, and decoupling capacitors all coupled together) directly. As such, no large S-parameter models need to be simulated in the time domain, circumventing any convergence and/or stability issues in the time domain simulation.

In some embodiments, users may begin in a block-based environment to setup the entire system. They may access the layout environment to modify the sub-system as needed without extracting new models for any layout changes. Any time domain simulation may be performed in the same block based environment, which may also include report generation.

Additional information regarding FDTD-based approaches and the analysis of multilayered electronic packaging structures may be found, for example, in U.S. Pat. Nos. 5,504,423 and 5,566,083, which are each hereby incorporated by reference in their entirety.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
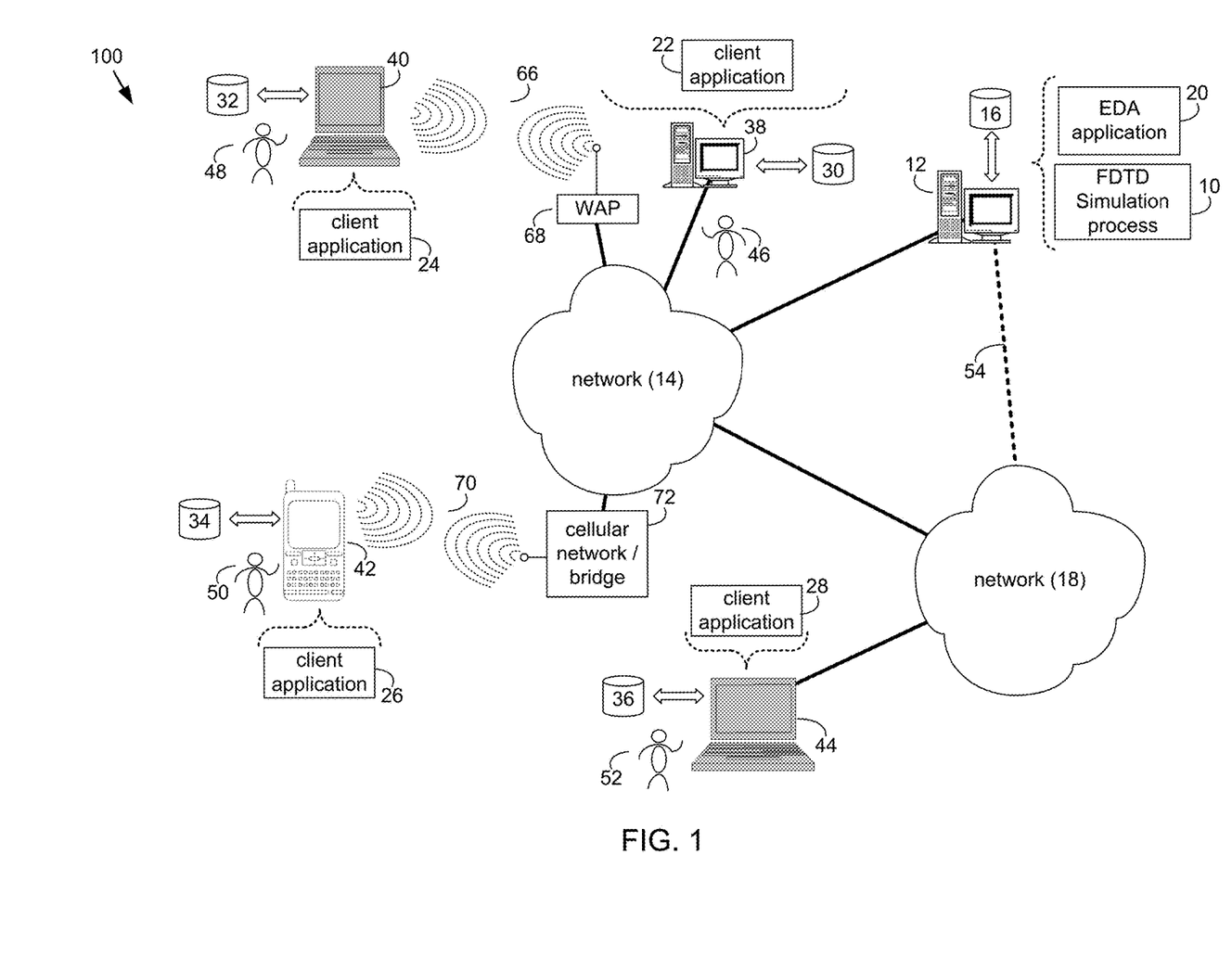
FIG. 1 is a system diagram depicting aspects of the FDTD simulation process in accordance with an embodiment of the present disclosure.

Referring to FIG. 1, there is shown a FDTD simulation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the FDTD simulation process may reside on and be executed, in whole or in part, by a client electronic device, such as a personal computer, notebook computer, personal digital assistant, or the like.

The instruction sets and subroutines of FDTD simulation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files and/or any suitable files that may be associated with an electronic design.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

FDTD simulation process 10 may be a stand alone application, or may be an applet/application/script that may interact with and/or be executed within EDA application 20. In addition/as an alternative to being a server-side process, the FDTD simulation process may be a client-side process (not shown) that may reside on a client electronic device (described below) and may interact with an EDA client application (e.g., one or more of EDA client applications 22, 24, 26, 28). Further, the FDTD simulation process may be a hybrid server-side/client-side process that may interact with EDA application 20 and an EDA client application (e.g., one or more of client applications 22, 24, 26, 28). As such, the FDTD simulation process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize FDTD simulation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
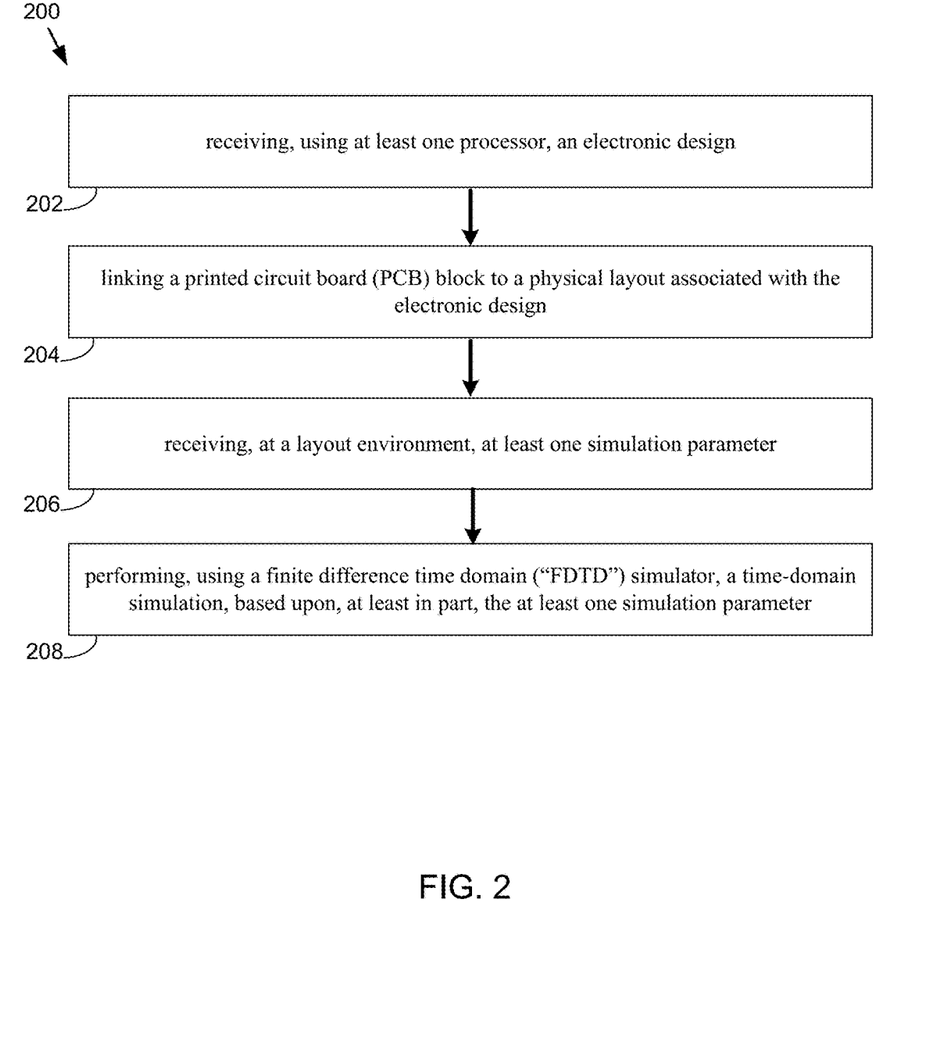
FIG. 2 is a flowchart depicting operations consistent with the FDTD simulation process of the present disclosure.

Referring now to FIG. 2, a method 200 consistent with an embodiment of FDTD simulation process 10 is provided. The method may include receiving (202), using at least one processor, an electronic design and linking (204) a printed circuit board (PCB) block to a physical layout associated with the electronic design. Embodiments may further include receiving (206), at a layout environment, at least one simulation parameter and performing (208), using a finite difference time domain ("FDTD") simulator, a time-domain simulation, based upon, at least in part, the at least one simulation parameter.

Figure 3:
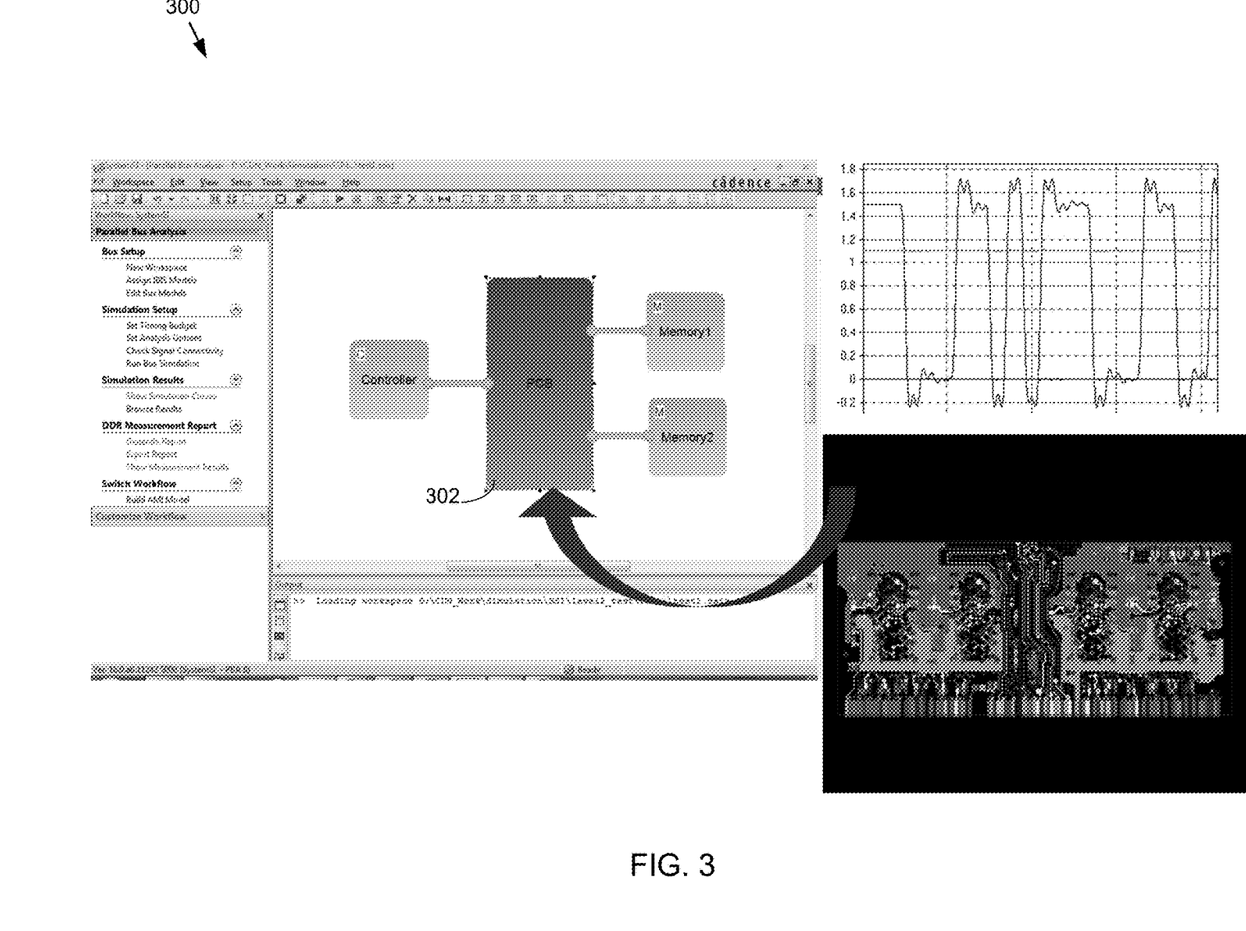
FIG. 3 is a diagram depicting aspects of the FDTD simulation process in accordance with an embodiment of the present disclosure.

Referring also to FIG. 3, a graphical user interface 300 consistent with the teachings of the present disclosure is provided. GUI 300 depicts an example of a block-based environment, which may be accessed by an electronic designer. The phrase "block-based environment", as used herein, may refer to any graphical user interface that allows a designer to select and/or manipulate one or more icons that may represent portions of an electronic circuit design.

In this particular example simulation results may be obtained by simulating pre-extracted models. As is shown in the Figure, in this particular example the layout may be first extracted as a Simulation Program with Integrated Circuit Emphasis ("SPICE") model and then assigned to a particular PCB block such as PCB block 302.

The approach shown in FIG. 3 works well when models are available to all the blocks of a system. However, it may be difficult for the designer if he/she does not have direct access to the layout that a model is based on. Moreover, any changes made to a physical design will result a new model. As such the user has to perform model extraction and assignment repetitively when performing what if analysis. Further, extracting interconnect models that include power distribution networks (PDN) and signals coupled together are generally done in S-parameter format; when extracting buses and PDN together, the resulting S-parameters can be very large (e.g., hundreds of ports) and are difficult to simulate in the time domain without convergence and/or stability issues.

Figure 4:
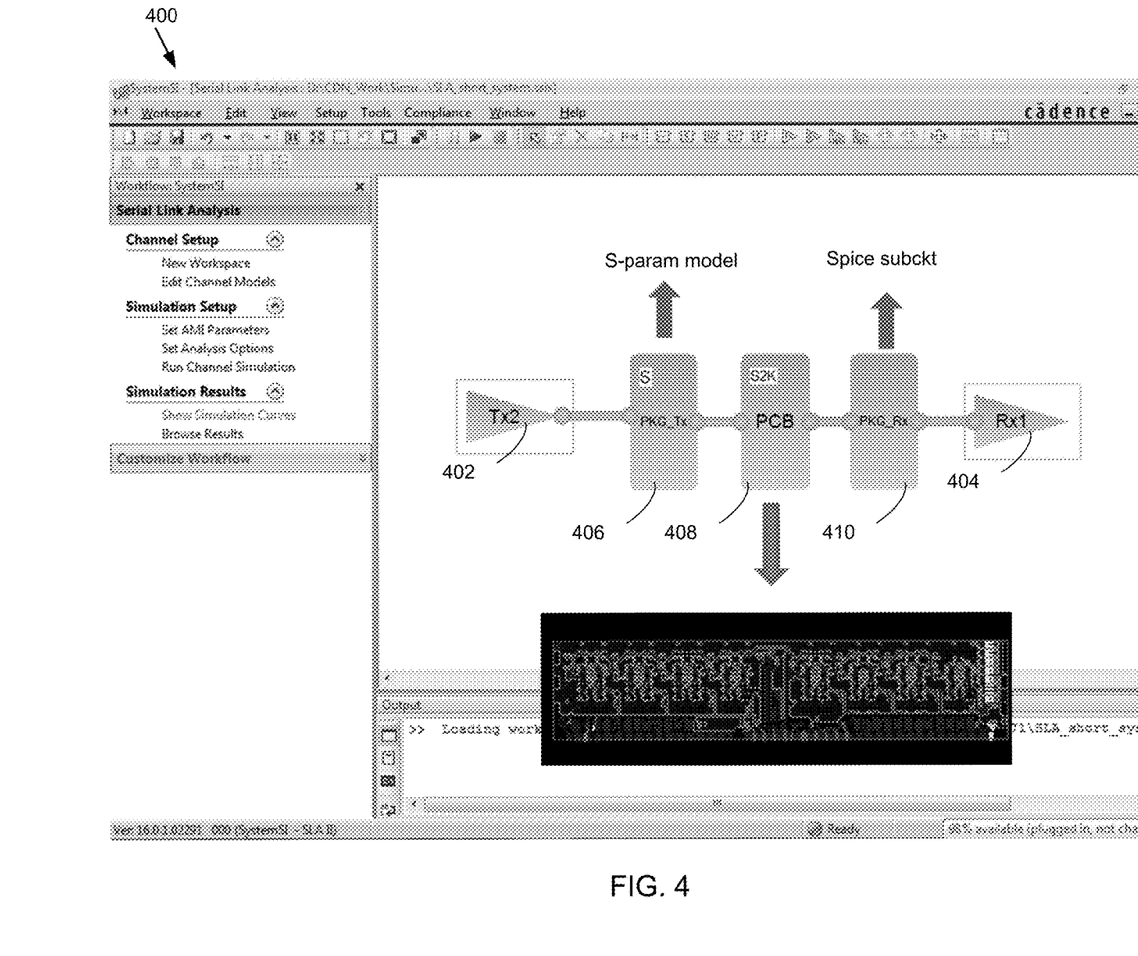
FIG. 4 is a diagram depicting aspects of the FDTD simulation process in accordance with an embodiment of the present disclosure.

In contrast, and referring now to FIG. 4, a graphical user interface 400 consistent with an embodiment of FDTD simulation process 10 is provided. In this particular embodiment, an FDTD-based simulation may be enabled through a layout association flow as is depicted in GUI 400. FIG. 4 depicts a block-based environment connecting transmitter 402 with receiver 404 through package 406, printed circuit board (PCB) 408, and package 410. GUI 400 may provide the designer with a number of design options some of which may include, but are not limited to, the channel setup, simulation setup, and simulation results options shown in GUI 400. Accordingly, the channel setup option may allow for the creation of a new workspace and may provide the ability to edit various channel models. The simulation setup option may allow for the setting of AMI parameters, the selection of analysis options, and/or performing of channel simulation.

As shown in FIG. 4, the printed circuit board (PCB) block, e.g. PCB block 408, may be directly linked to its physical layout environment. In some embodiments, the package and device blocks may continue to be represented by pre-calculated SPICE sub-circuit and/or S-Parameter models. In some embodiments, instead of simulating all of the models in the block-based environment, some or all of the pre-defined models may be automatically connected back to the physical layout database (e.g., through a connectivity protocol) for time domain simulation with the FDTD approaches described above. Accordingly, embodiments of FDTD process 10 allow for the physical layout geometry to be solved directly, on-the-fly.

Figure 5:
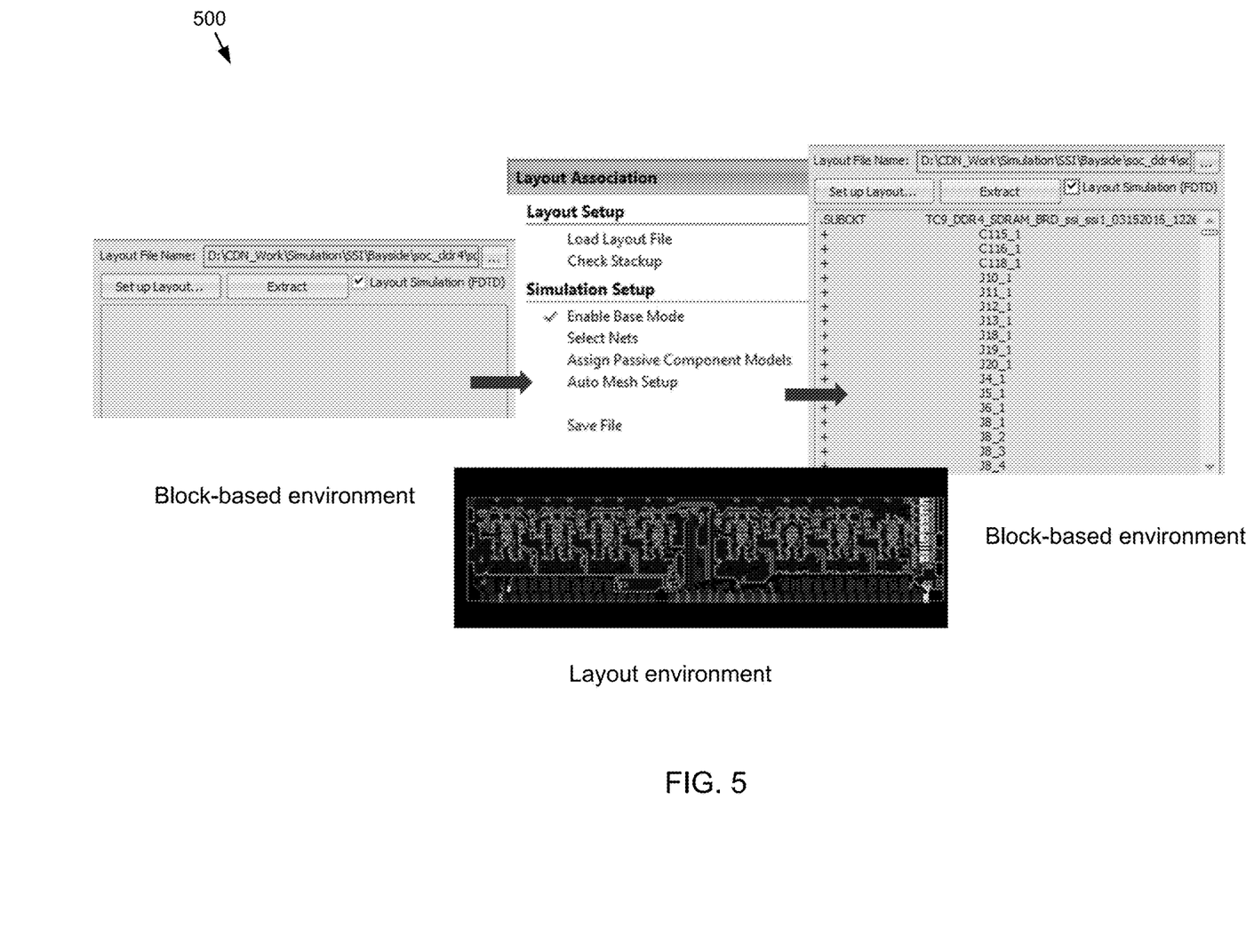
FIG. 5 is a diagram depicting aspects of the FDTD simulation process in accordance with an embodiment of the present disclosure.

Referring now to FIG. 5, a graphical user interface 500 consistent with an embodiment of FDTD simulation process 10 is provided. In this particular embodiment, GUI 500 depicts an example of interoperability between the block and layout environment, and more specifically, a layout environment that may be configured to allow a user to set up an FDTD-based simulation in accordance with the teachings of the present disclosure. As shown in the Figure, GUI 500 may allow the user to select one or more options using any suitable approach such as the drop down menu depicted in FIG. 5. The layout association option may provide numerous features some of which may include, but are not limited to, the layout setup and simulation setup options shown in the Figure. In some embodiments, the layout setup feature may include the ability to load a particular layout file and/or to check stackup as necessary. Additionally and/or alternatively, the simulation setup feature may include the ability to enable the base mode, select one or more nets, assign passive component models, and/or perform an automatic mesh setup.

Figure 6:
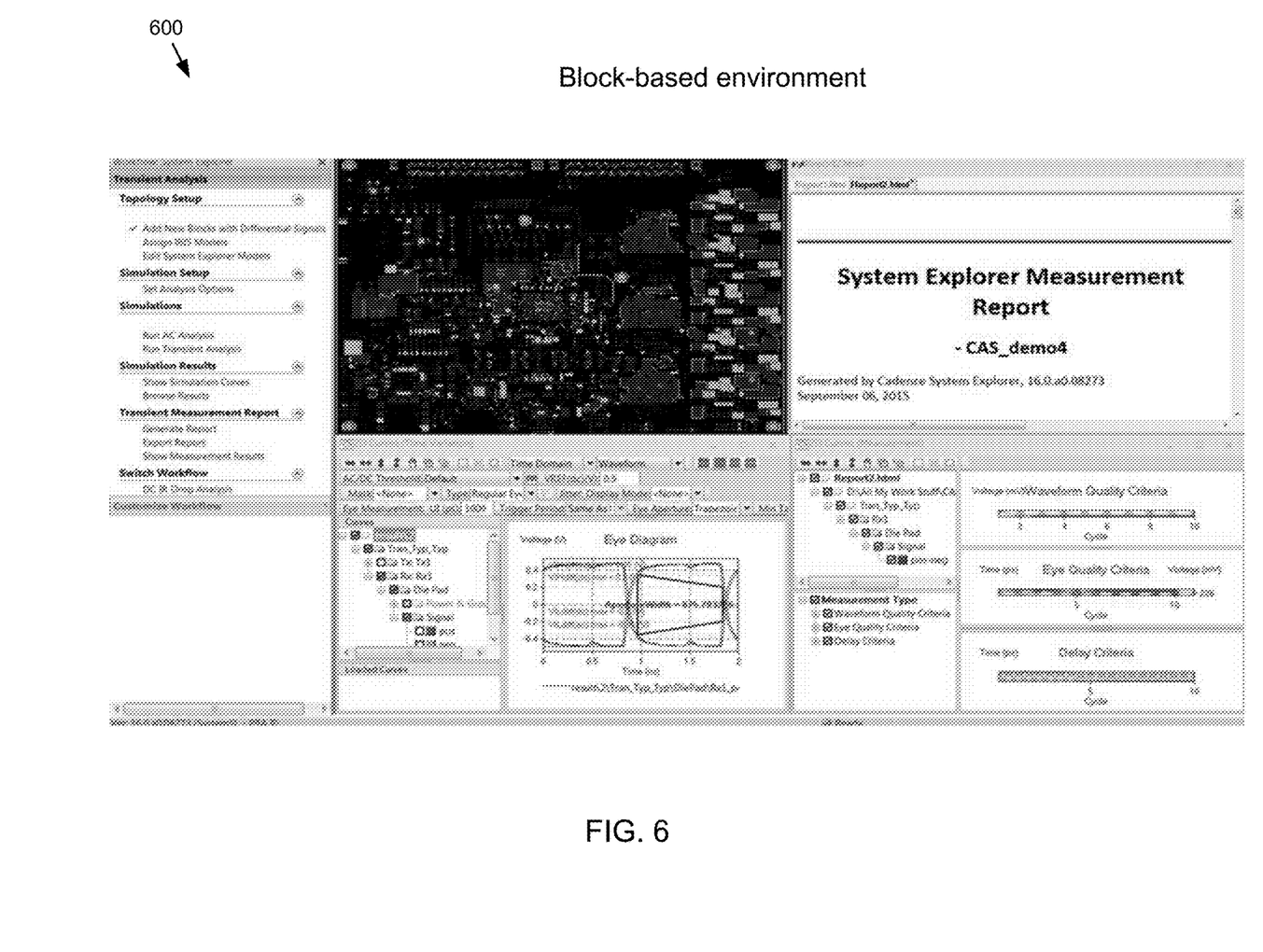
FIG. 6 is a diagram depicting aspects of the FDTD simulation process in accordance with an embodiment of the present disclosure.

Referring now to FIG. 6, a graphical user interface 600 consistent with an embodiment of FDTD simulation process 10 is provided. In this particular embodiment, GUI 600 depicts a report generation window, which may be configured to depict one or more results of the simulation. In operation, the FDTD simulation may be enabled in the block-based environment. Accordingly, the signals setup in the layout may be directly simulated, and the results may be reported and displayed in the block-based environment as is shown in FIG. 6.

Accordingly, and as shown in FIGS. 4-6, embodiments of FDTD simulation process 10 may be configured to combine layout-based and model-based modeling and analysis approaches into one unified system. In this way, pre-defined models may be used together with direct layout access for more efficient simulation and effective design exploration.

Embodiments of the present disclosure may allow users to start in the block-based environment to setup the entire system. They may access the layout environment to modify the sub-system as needed without extracting new models for any layout changes, perform time domain simulation, and obtain a report in the same block-based environment. Additionally and/or alternatively, embodiments of the present disclosure may use FDTD to solve the complex layout (e.g., including planes, traces, vias, and decoupling capacitors all coupled together) directly. Thus, large S-parameters do not need to be simulated in the time domain, which may circumvent any convergence and/or stability issues in the time domain simulation. This is a major benefit for "power-aware" signal integrity analysis, where the entire PDN needs to be considered together with the signals, along with all the couplings between them.

In some embodiments, EDA application 20 and/or FDTD simulation process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for in an electronic design comprising:
    receiving, using at least one processor, an electronic design;
    linking, at a block-based electronic design environment, a printed circuit board (PCB) block to a physical layout associated with the electronic design;
    receiving, at a layout environment, at least one simulation parameter; and
    performing, using a finite difference time domain ("FDTD") simulator, a time-domain simulation, at the block-based electronic design environment, based upon, at least in part, the at least one simulation parameter, wherein performing the time-domain simulation is performed at the layout environment directly and does not extract or use an S-parameter model of a particular block of the block-based electronic design environment.

2. The computer-implemented method of claim 1, further comprising:
    displaying at least one simulation result at a graphical user interface associated with the block-based electronic design environment.

3. The computer-implemented method of claim 2, further comprising:
    allowing a user to access the layout environment at the graphical user interface, modify the particular block without extracting new models for any layout changes at the graphical user interface, initiate, at the graphical user interface the time domain simulation, and visually review a report corresponding to the simulation result at the graphical user interface.

4. The computer-implemented method of claim 3, further comprising:
    allowing the user to perform a simulation setup that includes allowing for a selection of one or more nets, an assignment of passive component models: and
    automatically performing an automatic mesh setup based upon, at least in part, the simulation setup.

5. The computer-implemented method of claim 1, further comprising:
    receiving at least one additional block at the block-based electronic design environment.

6. The computer-implemented method of claim 5, wherein the additional block is at least one of a package block and a device block and wherein the additional block is represented by a SPICE model.

7. The computer-implemented method of claim 6, further comprising:
    connecting the SPICE model to a physical layout database.

8. The computer-implemented method of claim 5, wherein the additional block is represented by an S-parameter model.

9. A non-transitory computer-readable storage medium having stored thereon instructions that when executed by a machine result in the following operations:
    receiving, using at least one processor, an electronic design;
    linking, at a block-based electronic design environment, a printed circuit board (PCB) block to a physical layout associated with the electronic design;
    receiving, at a layout environment, at least one simulation parameter; and
    performing, using a finite difference time domain ("FDTD") simulator, a time-domain simulation, at the block-based electronic design environment, based upon, at least in part, the at least one simulation parameter, wherein performing the time-domain simulation is performed at the layout environment directly and does not extract or use an S-parameter model of a particular block of the block-based electronic design environment.

10. The computer-readable medium of claim 9, wherein operations further comprise:
displaying at least one simulation result at a graphical user interface associated with the block-based electronic design environment.

11. The computer-readable medium of claim 10, further comprising:
allowing a user to access the layout environment at the graphical user interface, modify the particular block without extracting new models for any layout changes at the graphical user interface, initiate, at the graphical user interface the time domain simulation, and visually review a report corresponding to the simulation result at the graphical user interface.

12. The computer-readable medium of claim 11, further comprising:
allowing the user to perform a simulation setup that includes allowing for a selection of one or more nets, an assignment of passive component models: and
automatically performing an automatic mesh setup based upon, at least in part, the simulation setup.

13. The computer-readable medium of claim 9, wherein operations further comprise:
receiving at least one additional block at the block-based electronic design environment.

14. The computer-readable medium of claim 13, wherein the additional block is at least one of a package block and a device block and wherein the additional block is represented by a SPICE model.

15. The computer-readable medium of claim 14, wherein operations further comprise:
connecting the SPICE model to a physical layout database.

16. The computer-readable medium of claim 13, wherein the additional block is represented by an S-parameter model.

17. A system comprising:
a computing device configured to receive an electronic design and link, at a block-based electronic design environment, a printed circuit board (PCB) block to a physical layout associated with the electronic design, the computing device further configured to receive, at a layout environment, at least one simulation parameter, the computing device further configured to perform, using a finite difference time domain ("FDTD") simulator, a time-domain simulation, at the block-based electronic design environment, based upon, at least in part, the at least one simulation parameter, wherein performing the time-domain simulation is performed at the layout environment directly and does not extract or use an S-parameter model of a particular block of the block-based electronic design environment.

18. The system of claim 17 wherein the computing device is further configured to display at least one simulation result at a graphical user interface associated with the block-based electronic design environment.

19. The system of claim 18, wherein the computing device is further configured to allow a user to access the layout environment at the graphical user interface, modify the particular block without extracting new models for any layout changes at the graphical user interface, initiate, at the graphical user interface the time domain simulation, and visually review a report corresponding to the simulation result at the graphical user interface.

20. The system of claim 19, wherein the computing device is further configured to:
allow the user to perform a simulation setup that includes allowing for a selection of one or more nets, an assignment of passive component models: and
automatically perform an automatic mesh setup based upon, at least in part, the simulation setup.

\* \* \* \* \*